United States Patent
Serrano-Morales et al.

(10) Patent No.: US 8,099,376 B2
(45) Date of Patent: Jan. 17, 2012

(54) RULE-BASED MANAGEMENT OF ADAPTIVE MODELS AND AGENTS

(75) Inventors: Carlos A. Serrano-Morales, Sunnyvale, CA (US); Carole-Ann Berlioz-Matignon, San Jose, CA (US); Franck Mangin, Le Sappey en Chartreuse (FR)

(73) Assignee: Fair Isaac Corporation, Minneapolis, MN (US)

( * ) Notice: Subject to any disclaimer, the term of this patent is extended or adjusted under 35 U.S.C. 154(b) by 980 days.

(21) Appl. No.: 12/036,161

(22) Filed: Feb. 22, 2008

(65) Prior Publication Data
US 2008/0208786 A1    Aug. 28, 2008

Related U.S. Application Data

(60) Provisional application No. 60/891,191, filed on Feb. 22, 2007.

(51) Int. Cl.
G06F 17/00 (2006.01)
G06N 5/02 (2006.01)

(52) U.S. Cl. ........................................ 706/47

(58) Field of Classification Search ............... 706/47
See application file for complete search history.

(56) References Cited

U.S. PATENT DOCUMENTS

| | | | |
|---|---|---|---|
| 7,904,341 B2 * | 3/2011 | Flinn et al. | 705/37 |
| 2007/0112574 A1 * | 5/2007 | Greene | 705/1 |
| 2008/0134042 A1 * | 6/2008 | Jankovich | 715/733 |

* cited by examiner

*Primary Examiner* — Jeffrey A Gaffin
*Assistant Examiner* — Li-Wu Chang
(74) *Attorney, Agent, or Firm* — Mintz, Levin, Cohn, Ferris, Glovsky and Popeo, P.C.

(57) ABSTRACT

A computer-implemented method described for making a recommendation with respect to a plurality of items using a plurality of adaptive models or agents. The described method includes receiving one or more business rules; receiving a request for a recommendation; receiving attributes relating to the request; activating one or more adaptive agents such that each activated adaptive agent generates one or more recommendations with respect to the items based at least in part on an evaluation of prior outcomes relating to the items; selecting from among the one or more recommendations at least one final recommendation; and displaying the at least one final recommendation to a user. Related apparatus, systems, techniques and articles are also described.

56 Claims, 14 Drawing Sheets

RULE-BASED MANAGEMENT OF ADAPTIVE MODELS AND AGENTS

CROSS-REFERENCE TO RELATED APPLICATIONS

This patent application claims priority to U.S. Patent Application No. 60/891,191, filed on 22 Feb. 2007, which is related to U.S. patent application Ser. No. 11/963,501 filed on Dec. 21, 2007, both of which are incorporated by reference herein.

TECHNICAL FIELD

The subject matter described herein relates to models used for information management systems. In particular, the subject matter describe herein related to rule based management of models used for information management and/or decisioning terms.

BACKGROUND

Automated decisioning systems have been developed to aid people and businesses to make faster, fact-based decisions in business settings. Typically, automated decisioning systems enable the user to make real-time, informed decisions, while minimizing risk and increasing profitability. Decisioning systems can be used to quickly assess risk potential, streamline account application processes, and apply decision criteria more consistently for approving decisions and/or selling new products or services.

Conventionally, decisioning systems have been based on predictive models and agents that do not adapt or learn from experience. Such predictive systems remain static after creation and must be manually updated. Adaptive agents and models have been developed which automatically learn from past experience. Examples of adaptive models used in the context of decisioning are described in co-pending U.S. patent application Ser. No. 11/963,501 entitled "Variable Learning Rate Automated Decisioning" filed on Dec. 21, 2007. However, the techniques described therein do not provide systems for setting up, maintaining and running systems for managing the adaptive agents and models.

SUMMARY

A system is described for making a recommendation with respect to a plurality of items using a plurality of adaptive agents. The system includes a plurality of adaptive agents each programmed to generate one or more recommendations with respect to the items based at least in part on an evaluation of prior outcomes relating to the items. A management system is arranged and programmed to receive one or more business rules, and manage the plurality of adaptive decisioning agents according to the business rules such that at least one final recommendation is selected from among the recommendations from the adaptive decisioning agents. The system also includes a user interface adapted to display at least one final recommendation to a user.

A computer-implemented method is also described for making a recommendation with respect to a plurality of items using a plurality of adaptive agents. The method includes receiving one or more business rules; receiving a request for a recommendation; receiving attributes relating to the request; activating one or more adaptive agents such that each activated adaptive agent generates one or more recommendations with respect to the items based at least in part on an evaluation of prior outcomes relating to the items; selecting from among the one or more recommendations at least one final recommendation; and displaying the at least one final recommendation to a user.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages including effective and efficient management of adaptive agents and model technology, enhanced ability to setup and maintain adaptive analytical technology, and the ability to more effectively respond to request for recommendations, and to correlate feedback information for learning purposes.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 9 is an example of a user interface screen for displaying customer information and recommendations and for receiving user input;

FIG. 12 is an example of a user interface screen for maintaining and updating a rule based adaptive decisioning system;

Like reference symbols in the various drawings indicate like elements.

DETAILED DESCRIPTION

Methods and related system such as described in co-pending U.S. patent application Ser. No. 11/963,501, entitled "Variable Learning Rate Automated Decisioning" filed on Dec. 21, 2007, which is incorporated herein by reference, can be used to predict likelihood in an uncertain environment. It is often the case that the data is not readily available or is changing quite rapidly. Therefore, such types of models, which can be referred to as adaptive analytics technology, can adjust themselves dynamically. Engines, often based on Bayesian networks or simple regression models, can be used to evaluate several competing items. A percentage score can be assigned to each one of them for a given transaction. Based on the percentage scores, a decision is recommended. After the recommendation, a feedback loop exposes the newly discovered facts as to the result of the recommendation to the engine for learning purposes. The engines use various techniques to improve speed of learning and accuracy of prediction.

Figure 1:
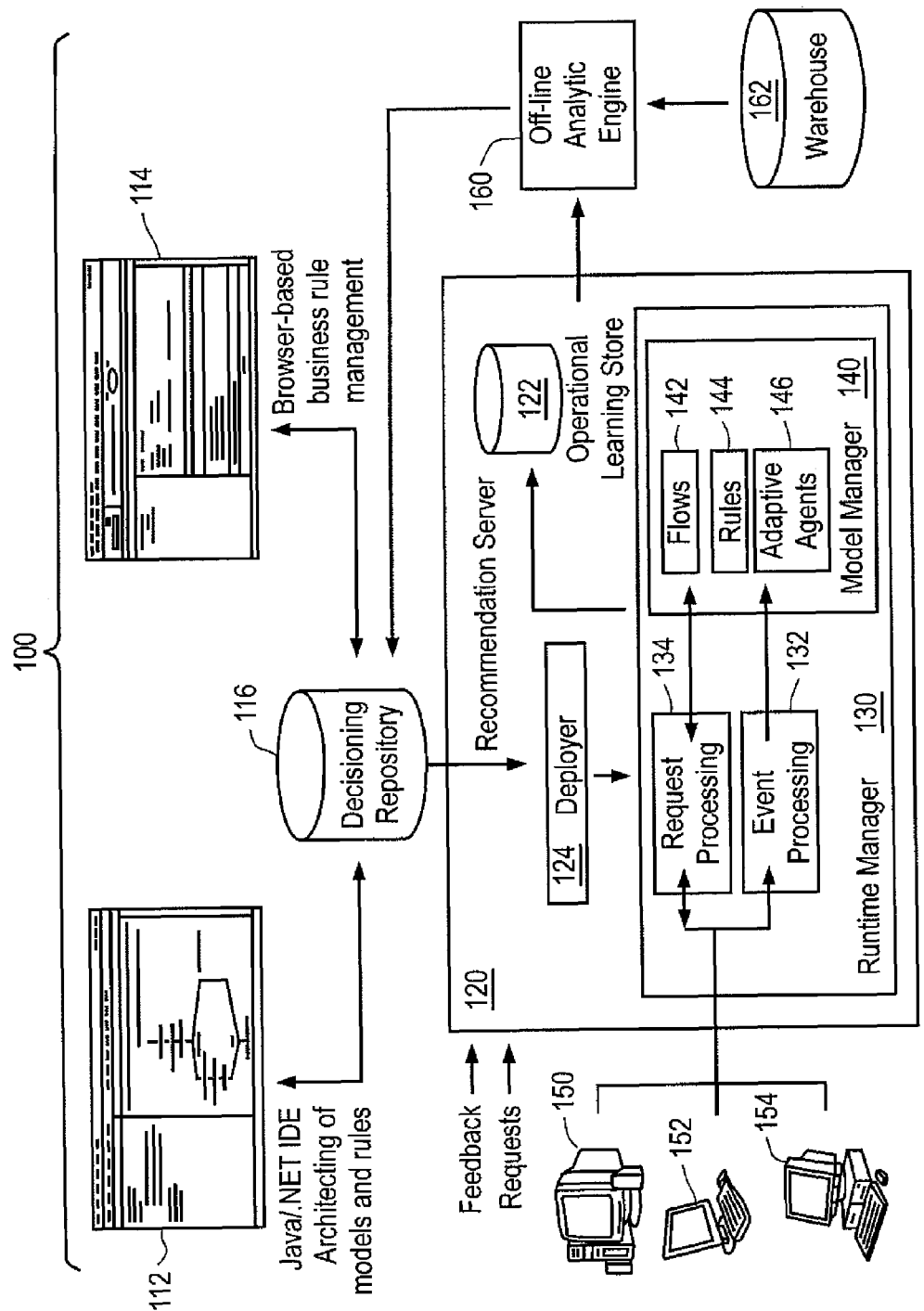
FIG. 1 is a block diagram showing certain components of a decisioning management system.

FIG. 1 is a block diagram showing certain components of a decisioning management system. Decisioning management system 100 makes use of adaptive analytics technology and can be integrated within an enterprise decision management technology suite. In particular, adaptive analytics technology configuration is maintained decisioning repository 116. Repository 116 is typically in the form of a database, but can also be maintained as a file system or source control management system. For example, repository 116 maintains the adaptive analytics technology configuration in the form of decisioning data, rules, and model definitions.

Using development environment 112, trained IT personnel, typically employed by the enterprise, design different types of decisioning technology. For example, IT personnel can use interface 112 to define adaptive models and associated rules which are then stored in repository 116. Environment 112 can be implemented as an integrated development environment built in Java or on top of the NET framework. Using browser-based interface 114, users, typically business users, can maintain the adaptive analytics system. For example, using interface 114 business users use a web-based environment also known as rules maintenance application (RMA) to carry out various maintenance tasks such as: introducing new items (such as new products for potentially offering to customers), creating or updating business rules, and setting initial bias associated with a newly introduced item. As used herein the term "item" is an object which adaptive or predictive models, algorithms, agents and engines can operate on to make one or more recommendations. In the context of an enterprise which sells products to customers, the items can be the products that are potentially offered to its customers. In the context of a supplier or agency selection system, the items can be the individual suppliers or agencies that are potentially chosen. In the context of a web advertising decisioning system, items can define the website, webpage and location on the webpage for potentially placing advertisements.

Recommendation server 120 receives requests for recommendations from and returns recommendation to user interfaces 150, 152 and 154. Additionally, recommendation server 120 receives feedback relating to the outcomes of recommendations from the user interfaces. Recommendation server 120 includes runtime manager 130 that is responsible for processing incoming requests using request processing component 134 as well as correlating follow-on events such as feedback using event processing component 132. The feedback and follow-on events can take the form of feedback received soon after the recommended action was taken with respect to an item. For example, where the recommendation is to make an offer to a customer for a product, the feedback can be whether the customer accepted or rejected the offer. Additionally, the feedback and follow-on events can take the form of feedback received after some time has passed, such as weeks or months after the recommended action was taken. For example, where a recommended offer for a product was made to a customer using one channel such as a website, the customer may initially decline the offer, but then three months later the customer purchases the same product through a different channel such as a retail store. Request processing component 134, in turn, issues requests to and receives requests from model manager 140. Event processing component 132 sends certain feedback and follow on event information to model manager 140, and sends certain feedback and follow on event information to be stored in operation learning store 122. Operational learning store 122 is responsible for logging all transactional and decision data pertinent to learning. Recommendation server 120 includes deployer 124 which is responsible for updating the agents, rules and other logic within runtime manager 130 based on definitions stored in repository 116. Deployer 124 reads the information from repository 116, recompiles it, and feeds it to the runtime manager 130.

Model manager 140 is responsible for making the decisions with respect to recommendations on items. Model manager 140 includes workflows 142 which determine the steps involved in the decision making process. Rules 144 are executed and adaptive agents 146 are run in a sequence according to the particular work flow. For example, according to a workflow, first certain rules may be executed, then model manager selects certain adaptive agents from a larger set of adaptive agent to execute. Further rules may then be executed and the final recommendation is then packaged and returned to runtime manager 130. Model manager 140 decides which of the flows are to be used, which rules to use and which and how many agents to use. Based on the applicable rules, model manager 140 can also create new agents and retire old agents.

In general, data warehouse 162 includes a much broader range of information than operational learning store 122. For example warehouse 162 may contain information on product catalogs, and data on transactions that are not being tracked by the adaptive systems. The offline analytic engine 160 can be used to test out or experiment potential new business rules and models with both using data stored in the operational learning store and in the data warehouse. Another use of the offline analytic engine 160 is to aid in recovery following a system crash, where analytic engine 160 can be used to re-train the adaptive models.

As used herein the term "adaptive agent" can refer to a piece of software that provides decisioning and/or predicting functionality and has the ability to learn or otherwise adapt from experience data or other environmental factors. The adaptive agents used in model manager 140 are based on adaptive models that are stored or otherwise stored in repository 116. Thus, the adaptive models defined in repository 116 are deployed within the model manager 140 as adaptive agents. Although for consistency in this description "models" are stored in the decisioning repository whereas "agents" are the models as deployed and executed within the recommendation server, as used, as used herein, the terms "agent" and "model" have the same meaning and scope. Likewise the terms "adaptive agent" and "adaptive model" have the same meaning and scope.

Figure 2:
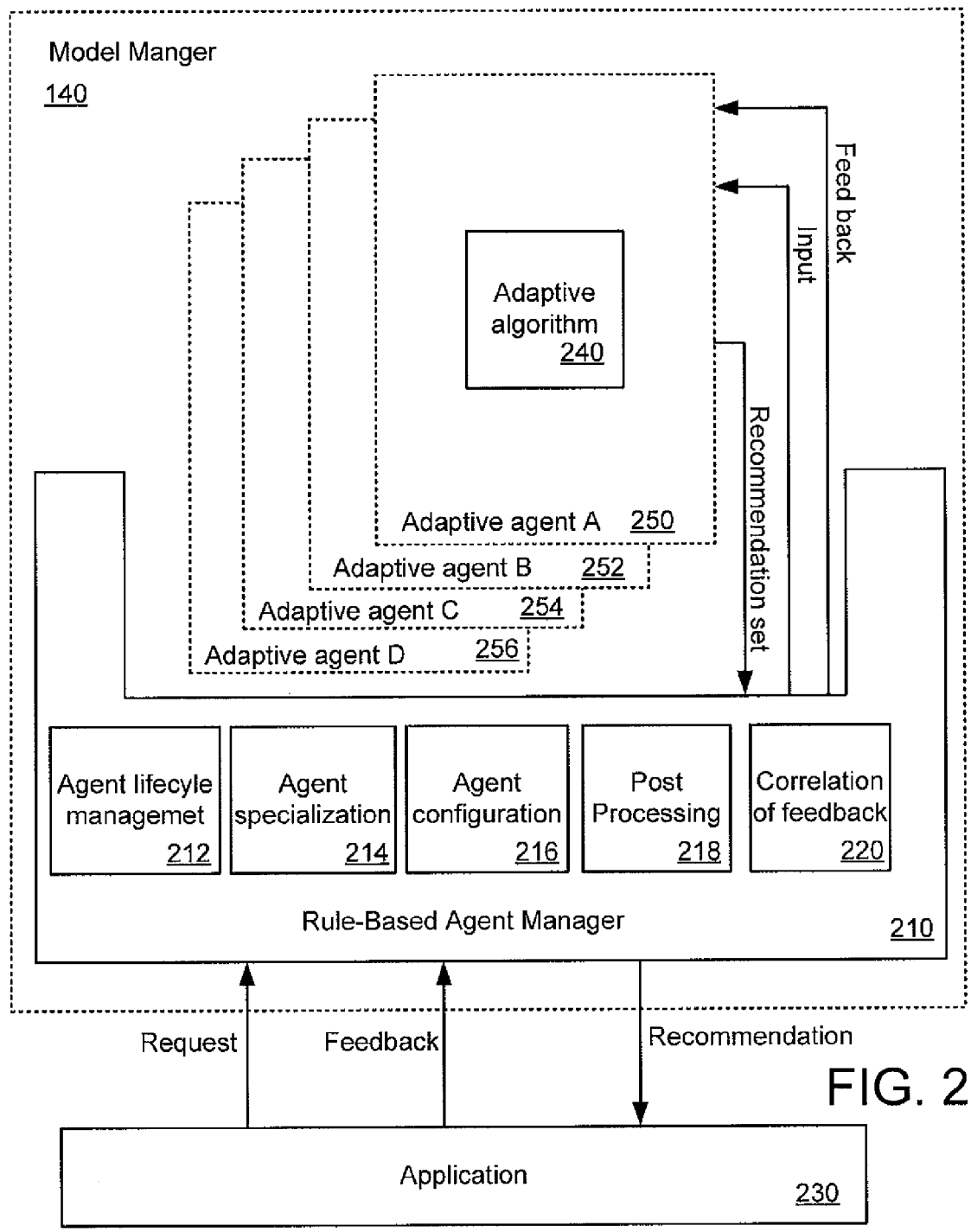
FIG. 2 is a block diagram of further detail of a model manager.

FIG. 2 is a block diagram of further detail of a model manager. Some further detail of model manager 140 is shown. Rule based agent manager 210 is responsible for managing several adaptive agents: namely Adaptive Agents A 250, Adaptive Agent B 252, Adaptive Agent C 254 and Adaptive Agent D 256. In general, than can be fewer or many more numbers of adaptive agents managed by rule based agent manager 210. Adaptive Agent A 250 makes use of adaptive algorithm 240, and takes input—such as a set of items, and feedback—such as a set of transaction data, and returns a recommendation set—such as a table of recommendations having associated probabilities and/or other attributes. Note that although not shown in FIG. 2, each of the other adaptive agents also take input and feedback from and return recommendation sets to rule based agent manager 210, and each can contain one or more adaptive algorithms.

In operation, rule-based agent manager 210 receives user requests from an application 230 via a request processing component in a runtime manager, not shown. Rule-based agent manager 210 also receives feedback from application 230 which may be in the form of immediate or long term feedback, Note that the feedback received from the application does not necessarily correspond exactly to the feedback fed into adaptive agent A 250. Multiple feedbacks can be correlated into a single feedback and likewise a single feedback and be correlated into multiple feedbacks, through the use rule-based logic which forms part of correlation of feedback component 220 within manager 210. The rule-based logic determines how the feedback received from the application will get translated into feedback provided to the adaptive agents.

Agent manager 210 includes agent lifecycle management component 212 which is responsible for starting new adaptive agents and retiring existing agents according to pre-defined rule-based logic. Agent manager 210 also includes an agent specialization component 214 which uses rule-based logic to determine to which adaptive agents each individual incoming requests should be routed. The rule based logic will make this routing, in general, based on the characteristics of the request. For example, there may be business rules defined that require that requests with respect to certain VIP customers only get routed to adaptive agents having a certain amount of experience.

Agent configuration component 216 is used qualify and disqualify certain items from consideration by the applicable adaptive agents. This component can be performed prior to executing the adaptive agents in order to reduce the number of items being considered by the agents, thereby improving both efficiency and accuracy of the recommendations. For example, in the setting of making offers for products, agent configuration components can use rules to determine that offers for certain products are geographically restricted and thus certain products should never be offered to customers in certain geographic regions.

Post processing component 218 is used once the one or more adaptive agents have returned their respective recommendation sets. Post processing component 218 uses business rules logic to determine how to translate multiple items from the recommendation sets into an overall recommendation taking into account one or more adaptive agents' run. In general, adaptive agents will be configured to output a recommendation set consisting of a list or table of input items having associated with each item a score, such as an acceptance probability if the case where the items represent products for sale. Post processing component 218 operates to pair down the recommendation set and issue back to the application and eventually the user, the single best recommendation. Post processing component 218 can be used to override or modify certain results returned by the adaptive agents. For example, a business owner may wish to perform a cost-benefit analysis prior to releasing a recommendation. If the projected profit from the highest acceptance probability item is considerably lower than another item having only a slightly lower acceptance probability, then post processing component 218 may override the recommendation set and instead recommend to the application that the higher profit item be offered.

Examples of the differences between adaptive agents include adaptive agent A 250 being a mature model having two weeks of stability and having been learning for 3 months; adaptive agent B 252 being a young model having been learning for only 2 months; and adaptive model C 254 being an infant model, having been only learning for 1 month.

Figure 3:
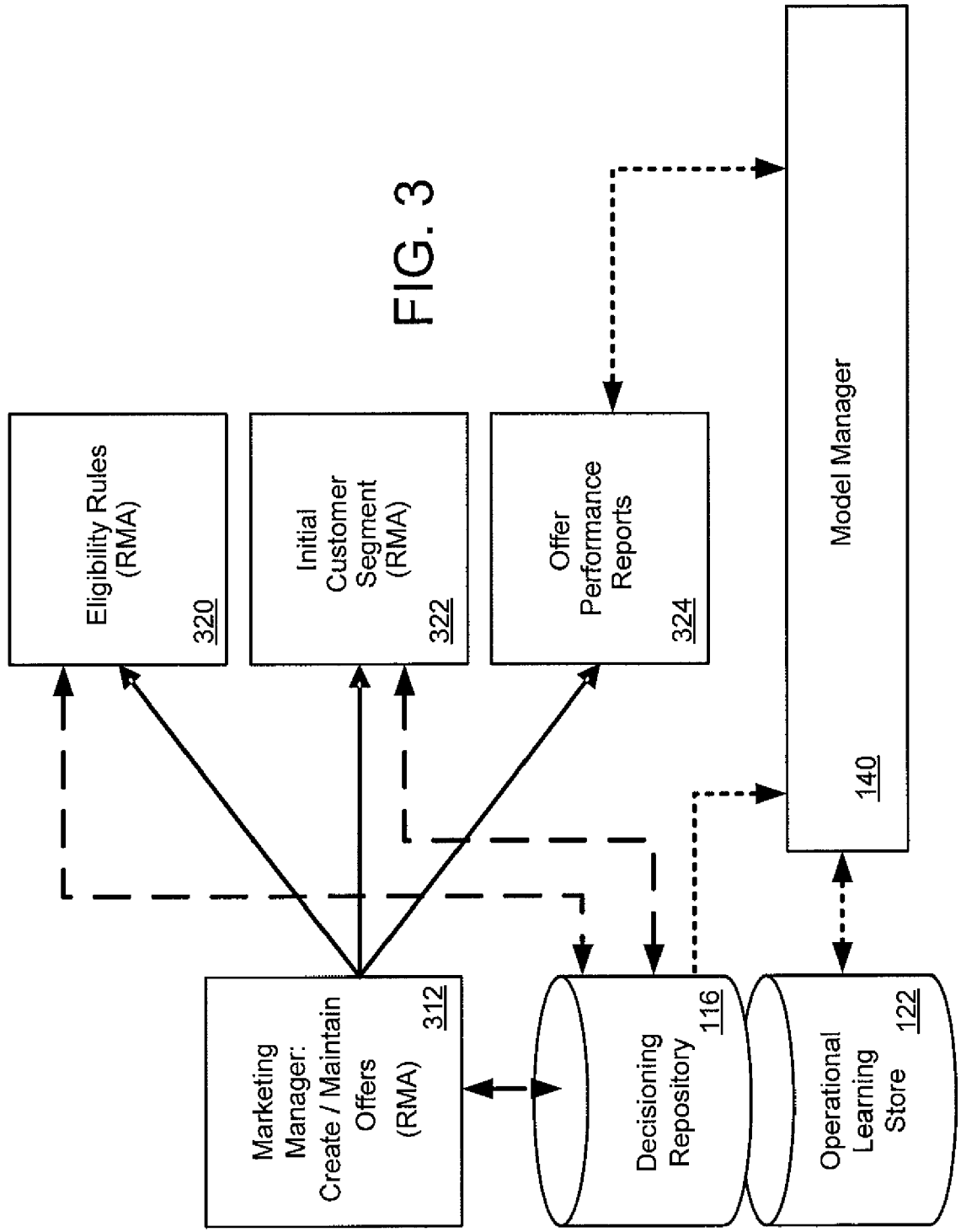
FIG. 3 is a block diagram of showing further detail of setting up, maintaining and updating a rules-based management system.

FIG. 3 is a block diagram of showing further detail of setting up, maintaining and updating a rules-based management system. A user 312, which in this example is a marketing manager creates and maintains offers for products. The marketing manager can use a web-based environment such as a rules maintenance application (RMA) as interface 114 described with respect to FIG. 1. Using the RMA interface, the eligibility rules 320 are created by the marketing manger. In general the eligibility rules correspond to the rules used by agent configuration component 216 in FIG. 2. For example, eligibility rules 320 could include geographic restrictions on certain offers, and/or customer qualifications on certain offers. The marketing manager also inputs an initial customer segment 322, which is used in setting the initial bias when introducing a new product or offering, as described more fully below. The marking manager can also generate and review performance reports 324 which can be used to illustrate information relating to the performance of various items being offered. Once created, the eligibility rules 320 and initial customer segment 322 are stored in the decisioning repository 116. The performance reports are run and updated based on information from the model manager 140 and operational learning store 122 as shown in FIG. 3. The marketing manger can also use the RMA interface to update, change or delete eligibility rules and biases stored within repository 116.

Adaptive analytics technology relies on various techniques to let adaptive agent or models "learn". As business conditions change or simply an understanding of the market evolves, adaptive agents or models are capable of adjusting their predictions accordingly. Adaptive agents or models take advantage of each transaction to accumulate knowledge that improves their precision. Further detail with respect to adaptive agents or models is found in co-pending U.S. patent application entitled "Variable Learning Rate Automated Decisioning" previously incorporated herein by reference.

It has been found that significant benefits can result from the combination of agents or models and business rules to increase the performance of the technology. As described herein, the recommendation server is business rules-driven. An advantage of a rules-driven configuration is the empowerment business users to create and maintain rule as is suitable for particular business needs. Compared to traditional configurations, such business users are offered with more options and/or more granularity.

Figure 4:
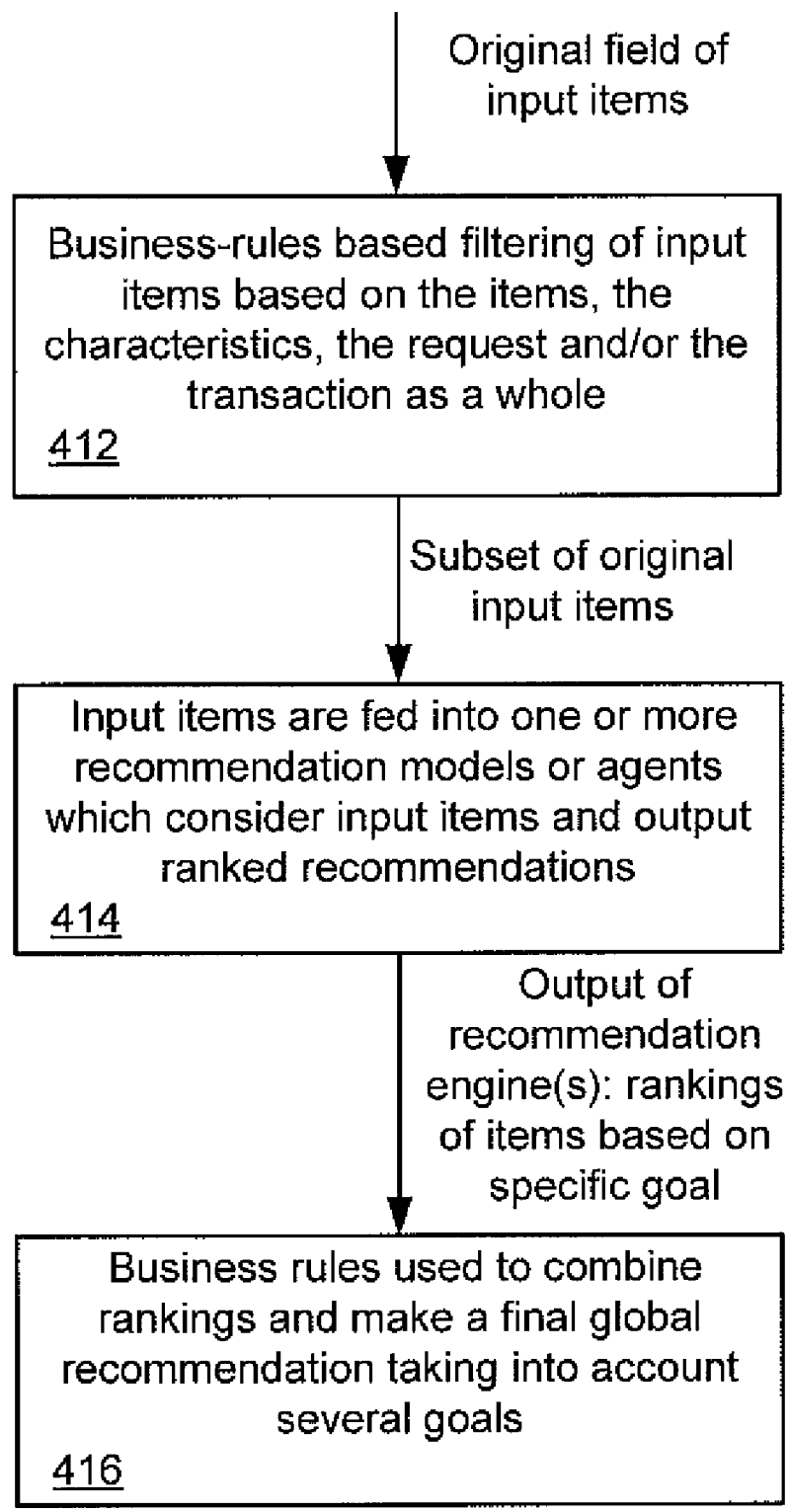
FIG. 4 is a flow chart showing steps relating to agent configuration and post processing using business rule management technology.

FIG. 4 is a flow chart showing steps relating to agent configuration and post processing using business rule management technology. As described with respect to agent configuration component 216 in FIG. 2, when a decision is taken by the recommendation server, business rules are used to determine eligibility. Items to be sorted by the recommendation server may have effective dates or other restriction policies. Business rules can enforce those limitations and reduce the number of items the engine is considering. In step 412, business rules have the ability to filter the original field of input items based on any type of restriction, whether it is based on the items and their characteristics, on the request itself or on the transaction as a whole. In step 414, the subset of input items is fed into one or more adaptive agents. As a result of the filtering, the adaptive agents processes fewer items and therefore can focus on the eligible items rather than a longer list. This leads to better runtime performances of course but also better business performance as the agent does not waste time learning over ineligible items. Instead of ruling out a whole category of items, the engine can be invoked with a tailored list of items that match exactly the needs of the business. The recommendation agents or models output rankings of the items based on a specific goal.

As described with respect to post processing component 218 in FIG. 2, business rules can also be used after the adaptive agent's invocation. For example, multiple goals can be pursued simultaneously and then challenged according to business criteria. Each adaptive agent provides rankings for each eligible item, based on a single goal in mind. In step 416, business rules are used to combine those rankings and make a final global recommendation, taking into consideration all those goals. Business rules here can vary from simplistic weighted goals to complex segmentation-based goal management. Again, because business rules are descriptive in nature, business users have total control over the logic.

Business rules offer flexibility to refine the logic before and after execution, extending the capabilities of traditional recommendation engines. Business rules are maintained by the business users in a web application, enabling them to fine-tune the logic with no IT involvement. Interface technology such as RMA technology allows business users to be self-sufficient without having to spend excessive time to learn technology, or technical scripting language.

After the technology is installed and integrated with the environment, the set up can be performed by a business user. Business rules are displayed to the business user in a web application. The underlying technology can be somewhat hidden from the business users such that only business screens tailored to their particular business application are displayed. The following United States Patents provide further detail in business rules management, execution and/or related user interfaces, each of which is hereby incorporated herein by reference: U.S. Pat. Nos. 6,968,328; 7,152,053; 6,865,566; 7,277,875; 6,993,514; 6,965,889; and 6,944,604. Adaptive analytics technology concepts can be displayed via templates in a fashion similar to as described in U.S. Pat. Nos. 7,152,053 and 7,277,875.

Business users can define in a point-an-click interface the items to be scored by the engine (products, promotions, actions, etc.). Eligibility rules are associated with each relevant item. Those rules can be fairly simple, including or excluding items based on their characteristics, based on the request, the transaction or the overall context. They can also be quite sophisticated combining several additional factors such as customer segmentation or traditional predictive scores.

Those business rules are to be executed prior to the model invocation within the recommendation agent or model. They filter out items that are not available for the request or that business users explicitly want to keep out. By reducing the search space, the runtime performances are accelerated, and the recommendations are constrained according to business objectives rather than technical feasibility. As described, the system can also be configured to execute rules after the model has scored the items. In the same rules maintenance application, the business user can now edit rules that are responsible for the offer selection.

One model is usually assigned to a single goal. The recommendation server can combine the scores for each item, one per goal, into a multi-goal score. The formula is driven by business rules. According to one example, weights can be associated with each goal. The compound score would compute then the compound score linearly. More complex logic may offer the flexibility to vary the weights depending on customer segmentation. Gold customers with a high level of frustration would enjoy a higher level of "retention" compared to new customers that may fall more heavily into a "maximize value" category. This logic could yet again be customized to vary based on interest rates, spending behavior, etc. Since the multi-goal calculation is business rules-driven, there is no limit to the types of calculations one could set up.

Policy rules can also be executed after scoring each item. This mechanism is particularly useful when business owners want to perform a cost-benefit analysis prior to releasing a recommendation. If one item costs a lot more than its alternative but its odds of success are just slightly higher, a cost-sensitive organization may decide to override the model decision via a built-in policy rule they can activate and deactivate as appropriate.

Pre- and post-processing rules are being executed by the recommendation server when the request is received, before the agent scores each eligible item, and when the engine returns, prior to the response being sent to the invoking client.

Following are some examples using single conditions. In a call center application setting, eligibility rules can refer to offer limitations such as: time limits during which the offer is available (e.g. promotion runs from 2/14 to 3/27); limits on type of offer (e.g. conventional mortgages are only available to loan amounts less than $417,000); and geographic limitations to offer (e.g. mobile phone is only available in the 48 contiguous states). Other eligibility rules may refer to other contextual information such as: a limited number of offers is available (e.g. limited number of rebates available—stop offering once the pool has been distributed); and offers are only applicable to customers with certain qualifications (.e.g. send gold offers only to gold and platinum customers). Although the above examples use a single condition for simplicity, one could create much more complex logic made of several conditions. Alternatively, a plurality of conditions can be combined as one or more decision trees or decision tables.

In some business applications, simple revenue or profit maximization from the offer may not be the goal, or may not be the only goal. In multiple goal situations, for example, customer retention is often viewed as a goal which must balanced with other business goals. Offers programs that enhance customer retention can be costly to the company but may be greatly appreciated by the customer. Additionally, up-selling and/or cross-selling offers may result in an overall increase in the customer's lifetime value to the company. In a typical interaction, the focus is on maximizing revenue or profit. However, when an important customer (e.g. such as a "gold customer") is upset or dissatisfied, this information may be interpreted by business rules such that the primary goal is changed to a "customer retention" goal rather than profit maximization. A scoring mechanism such as a chum score can be used to estimate the propensity that the customer will cancel an agreement or leave the supplier.

Initial bias is a mechanism that can be used to introduce a new offer in the system with predefined odds of success. Without an initial bias, the recommendation server may rarely try out a newly introduced offer. The initial bias increases this offer frequency, and can be set globally. Using a business rules-based approach, a business user sets the initial bias in a granular fashion, based on any criteria(s) available in the context. This capability can be important in differentiating several markets or customer segments. Business users have the ability to set an initial bias by default and then override it as appropriate for each customer niche they wish to specify.

Figure 5:
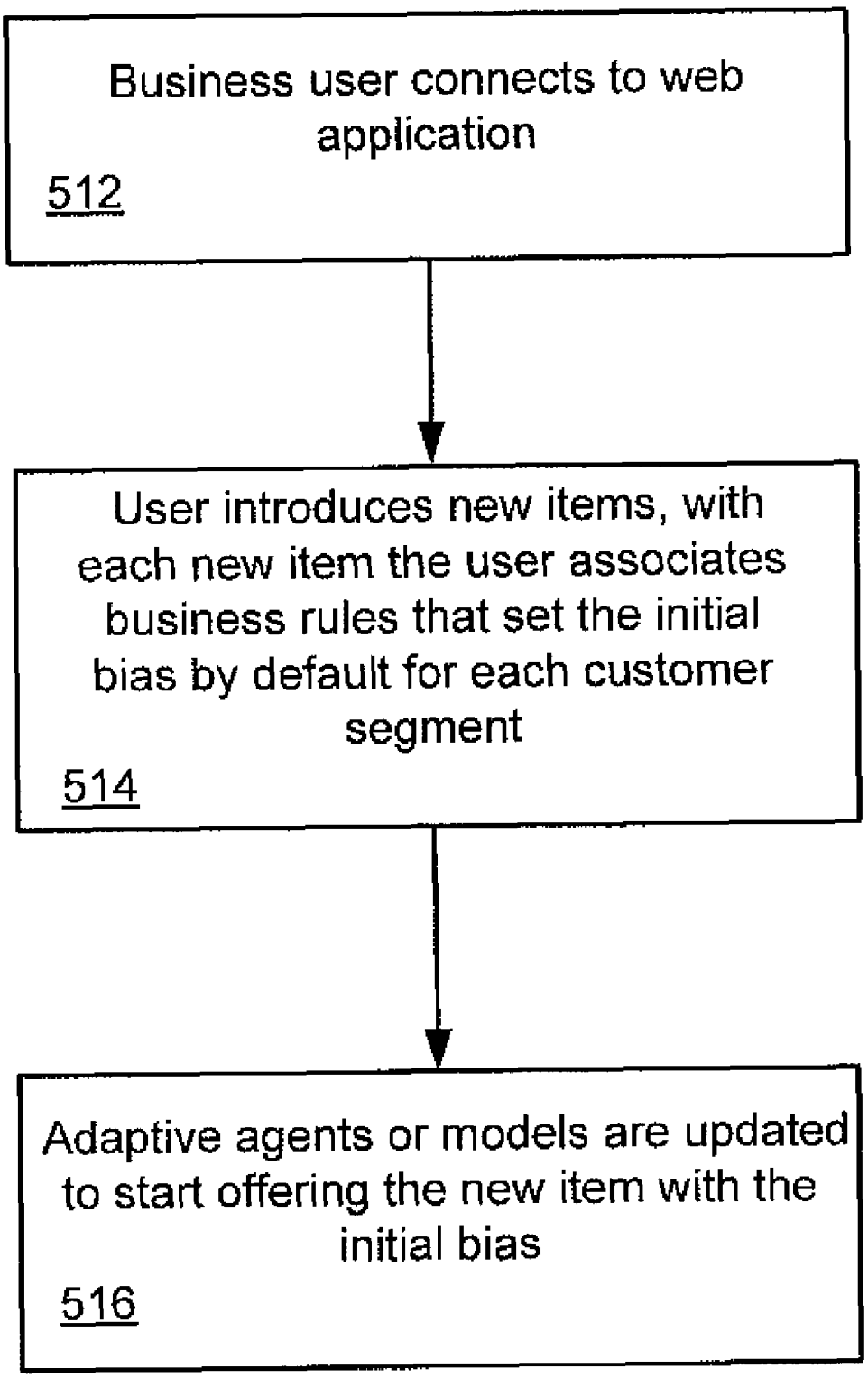
FIG. 5 is a flowchart showing steps of setting initial bias using a recommendation engine management system.

FIG. 5 is a flowchart showing steps of setting initial bias using a recommendation engine management system. In step 512, a business user connects to a web application such as describe with respect to interface 114 in FIG. 1. In step 514, the user introduces new items. With each new item, the user associates business rules that set the initial bias by default and for each customer segment. The associated business rules can be based on data coming from the item, the request, or the transaction. In some cases, the business rules may be associated with contextual information. In other cases, predictive models and other decisioning technologies can also be used as criteria(s) for setting this initial bias up. For example, if the churn score is high, an item considered "a good deal" may enjoy a higher ranking.

In step 516, the initial bias is then used to set up the adaptive agent or model. An existing agent with historical data available to justify the decisions can be updated to now start offering the new item. This item is then forced with the initial bias in general but can be tweaked to behave as specified in the sub-segments.

The resulting prediction takes into account the business users' "intuition" or knowledge of the business and therefore converges faster to the right probability, assuming the business user was right. The override value can be above or below the default value, depending on whether the business user thinks the item will be successful or not in that segment.

Note that this capability only impacts the performance of the prediction when the item is introduced. After sufficient evidences have been observed by the engine, it will adapt to the right value at that point in time.

This initial bias capability helps the marketers push for new trendy items faster. As the popular Nintendo Wii or Apple iPhone enjoys great market success, promotion giving away those products or related accessories are likely to be successful as well. The faster the offer is introduced and proposed, the more market share the company could theoretically win. Those products may be likely to be more successful in younger customer segments that are technology-savvy, and less in low income brackets. Marketers can now profile, based on their experience, the appropriate targets and assign higher initial bias for those items. Low-income brackets will be assigned a lower score, assuming that "free minutes" or "free services" would represent a higher value there.

As described with respect to FIGS. 1 and 2, a recommendation server typically includes several adaptive models or agents. At any given point in time, the experience of each adaptive model or agent will vary as they have been exposed to different transactions and therefore have different experiences. Techniques for business rules-driven model lifecycle management will now be described which can often bring value to the overall solution. The recommendation models or agents are exposed to many transactions that will help them converge to a set of recommendations, and rankings, for each segment. Defining when to create and new model or agent, how to route transactions to that new model or agent instead of the mature one, can be governed by business rules. As business users know the industry, such individuals are the best people to decide those configuration options. Providing the users the capability to define and use business rules greatly increases the user's control over the lifecycle of the models. Based on items, transactions, contextual information or derived predictive scores, business users can set up tailored policy.

Creating a new model is important to the business as it determines how often you want to forget about past trends and start "fresh". Choosing how many competing models or agents are deployed will also create some chaos as each one of them requires a fair amount of "wrong recommendations" to ensure that trends are not shifting within a customer segment. But in exchange, many agents will be more sensitive to heterogeneity of the marketplace.

Figure 6:
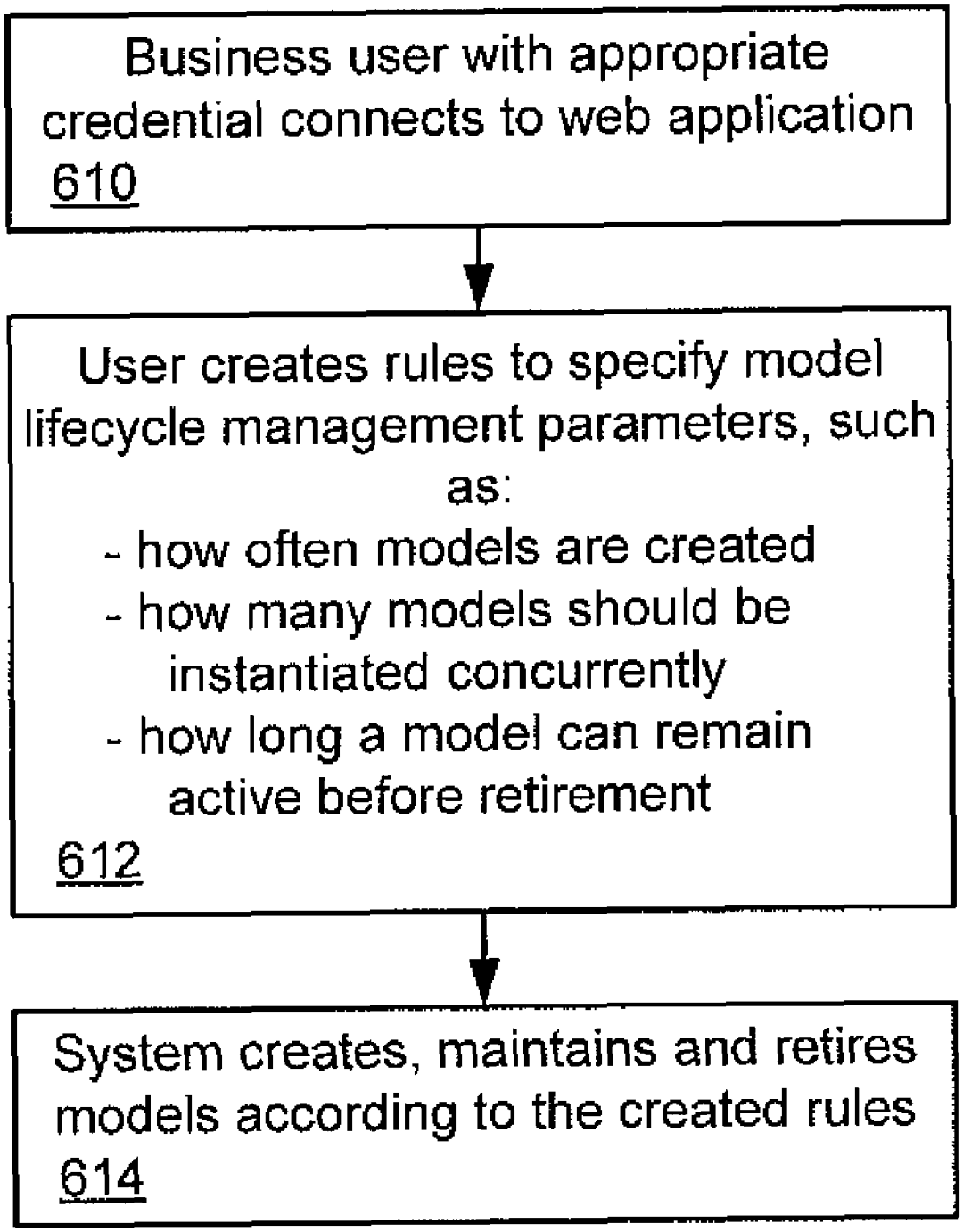
FIG. 6 is a flow chart showing steps in generating and implementing in business rules relating to model lifecycle management.

FIG. 6 is a flow chart showing steps in generating and implementing in business rules relating to model lifecycle management. In step 610, a business user with the appropriate credentials connects to a web application such as described with respect to interface 114 in FIG. 1. In step 612, the user starts creating rules to specify the required parameters for example: how often models should be created; how many models should be instantiated concurrently; and how long a model can live before being retired. For example, in step 612 the business rules created by the user can be a simple attribute such as: "I want a new model created each month". The business rule can also be based on performance data, such as: "I want a model to be retired when its performance gets below 50% for 100 consecutive transactions".

According to another example, the technology is applied to marketing ring-tones. In this application, it is likely that young people will be highly sensitive to new bands and other trends. In such a fast paced environment for change, a high frequency of model creation rule can be set which is likely to pick up those nuances quite quickly. In step 614, the recommendation server creates, maintains and retires models or agents according to the created rules, as described with respect to agent lifecycle management component 212 in FIG. 2.

Model specialization can be a specialized feature of the lifecycle management capability. As described previously above, models or agents are managed by the model manager, and through a lifecycle management component, rules dictate how often models are created and retired. Using business rules and a mechanism such as describe with respect to agent specialization component 214 in FIG. 2, one can intentionally direct different traffic to each one of those engines, creating therefore specialized engines. Each specialized engine or engine set would be expert in dealing with a specific segment and would converge quickly to the best recommendation.

Figure 7:
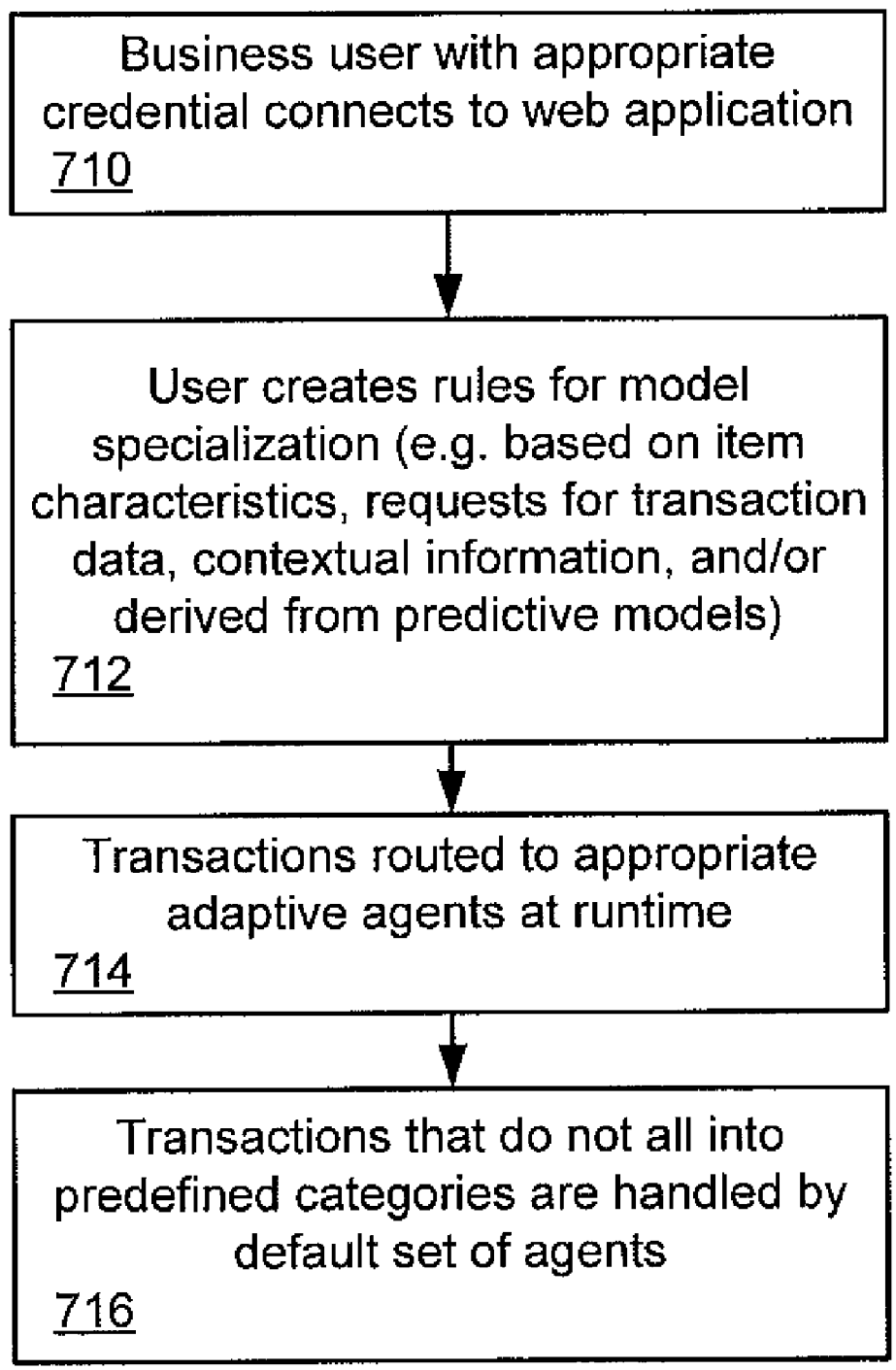
FIG. 7 is a flow chart showing steps in generating in and implementing business rules relating to model specialization.

FIG. 7 is a flow chart showing steps in generating in and implementing business rules relating to model specialization. In step 710, business users connect to the web application and create business rules for model lifecycle under the model specialization category. In step 712, the user creates rule for model specialization. Rules can be based on item characteristics, request or transactional data, any contextual information, or derived predictive models. In step 714, transactions are then routed to the appropriate agents at runtime. In step 716, a transaction that does not fall into one of the categories defined by the rules created in step 712, is handled by a default set of agents.

It has been found that model specialization is a particularly useful feature for any seasonal activity. A Holiday set of engines can make recommendations based on patterns that differentiate buyers at that time of the year. Model specialization is also useful for special channels. Branches, call centers and self-serve web application may propose similar types of products but with a twist. People connecting via the internet are more likely to be interested in Blackberry phones with a data subscription for browsing the web. Assuming the marketers know the buying patterns are different but can't express a priori the initial bias, they may use model specialization as a way to let the engine deal with this segment differently without the noise created by the other touchpoints' experiences.

According to yet another example, daytime and nighttime personnel are trained differently. Daytime and nighttime recommendation engines are trained differently using model specialization. Night-time and weekend users may indicate an emergency or a different type of buying pattern. Having agents focused on this segment allow the recommendation server to become more effective faster. Thus there can be a great number of model specialization applications. Providing business rules configuration capability allows the system to behave as directed by knowledgeable persons in the field.

Adaptive analytics technology is used to aid the operation of a call center. The call center may have a customer relationship management (CRM) application, with which the adaptive analytics technology is integrated. As new or existing customers connect, via a call center, a web application or in person in a store/branch, promotions can be offered, aimed at up- or cross-selling products or at satisfying an upset customer. An adaptive analytics-based recommendation server is appropriate for analyzing the large number of products and options and recommending a promotion the customer is likely to accept. Because trends change rapidly and data can be quickly outdated for some demographics, adaptive analytics can make the best out of what is available and keep improving as transactions go through.

Figure 8:
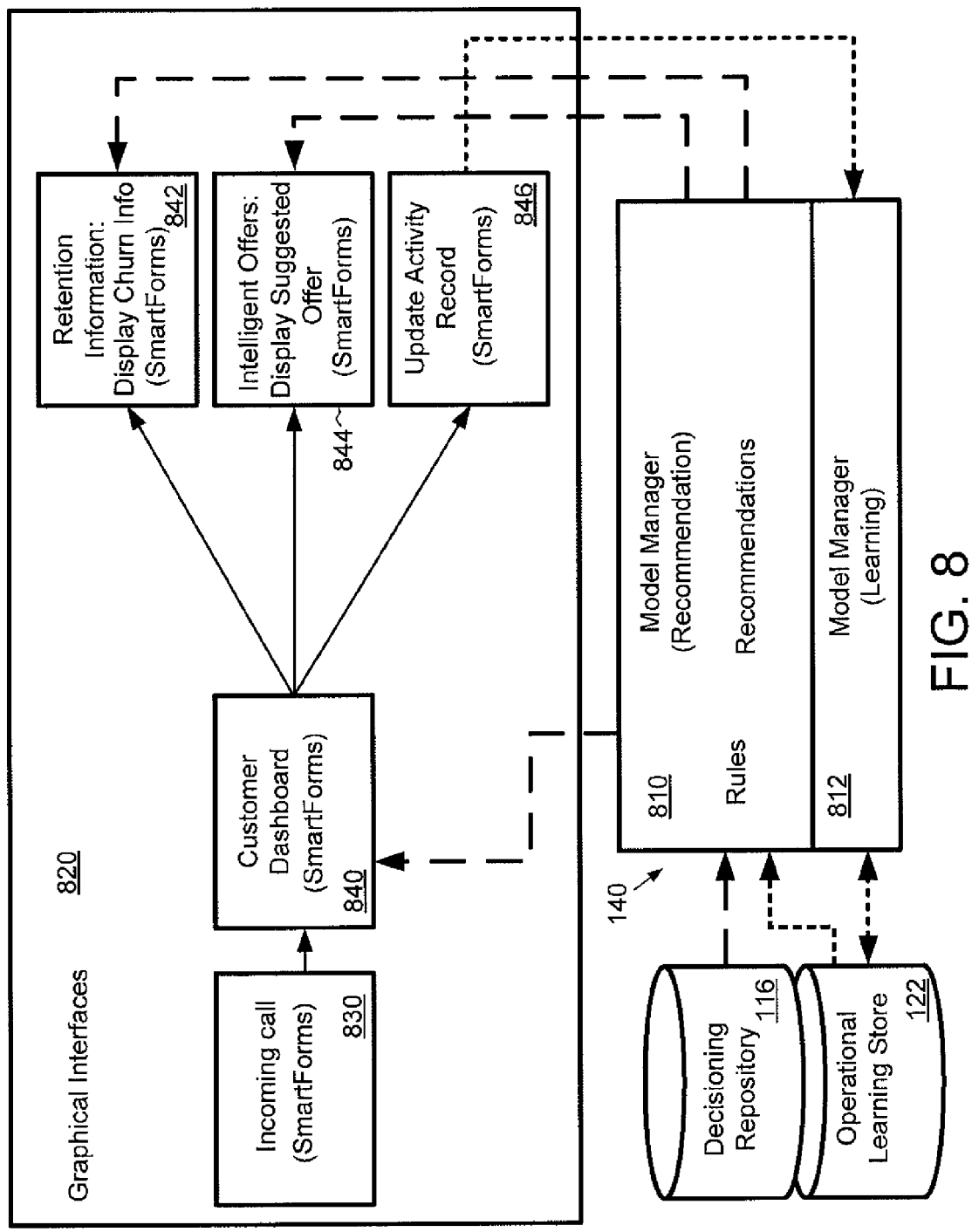
FIG. 8 is a block diagram showing further detail of a user interface for receiving customer and transaction information and for displaying recommendations.

FIG. 8 is a block diagram showing further detail of a user interface for receiving customer and transaction information and for displaying recommendations. Graphical interfaces 820 correspond to user interfaces 150, 152 and 154 in FIG. 1, and are used to display information and receive user input. Interface 820 includes a main screen 840 called a customer dashboard, which contains customer information and includes a retention information area 842, intelligent offers area 844 and area to update activity information 846. The interface 820 can be implemented using an interactive web-based form extension such as SmartForms, for the Blaze Advisor system from Fair Isaac Corporation. When an incoming call 830 is received, main screen 840 displays the customer's information along with the churn information in area 842, suggested offers in area 844 and allows user input in update activity area 846. The churn information and suggested offer are supplied by a recommendation portion 810 of model manager 140 which receives information from both decisioning repository 116 and operation learning store 122. Update activity information is fed to learning portion 812 of model manager 140, which in turn feeds transaction data to operational learning store 122.

A request for recommendation is initiated by the interface application 820 and can take the form of "Customer X wants to add minutes to plan, what do you recommend?" Recommendations are returned by the recommendation server with an assessment of probability of acceptance for that particular customer, the recommended offer and the particular circumstances.

An information event is pushed by the user interface application 820 and/or the environment and can take the form of: "Customer X accepted the offer for a service upgrade to service Y;" "Customer X is still a customer of service Y after 6 months;" or "Customer X wants a new phone for service Y." The information event is processed by the recommendation server to refine its recommendations in the future through learning. Note that information events can be strongly or weakly correlated to recommendations made. For example, an offer acceptance may be strongly correlated to the offer made, while a service subscription and stickiness to that service may be more weakly correlated. However, the recommendation Server can learn based on either of these information events.

Figure 9:
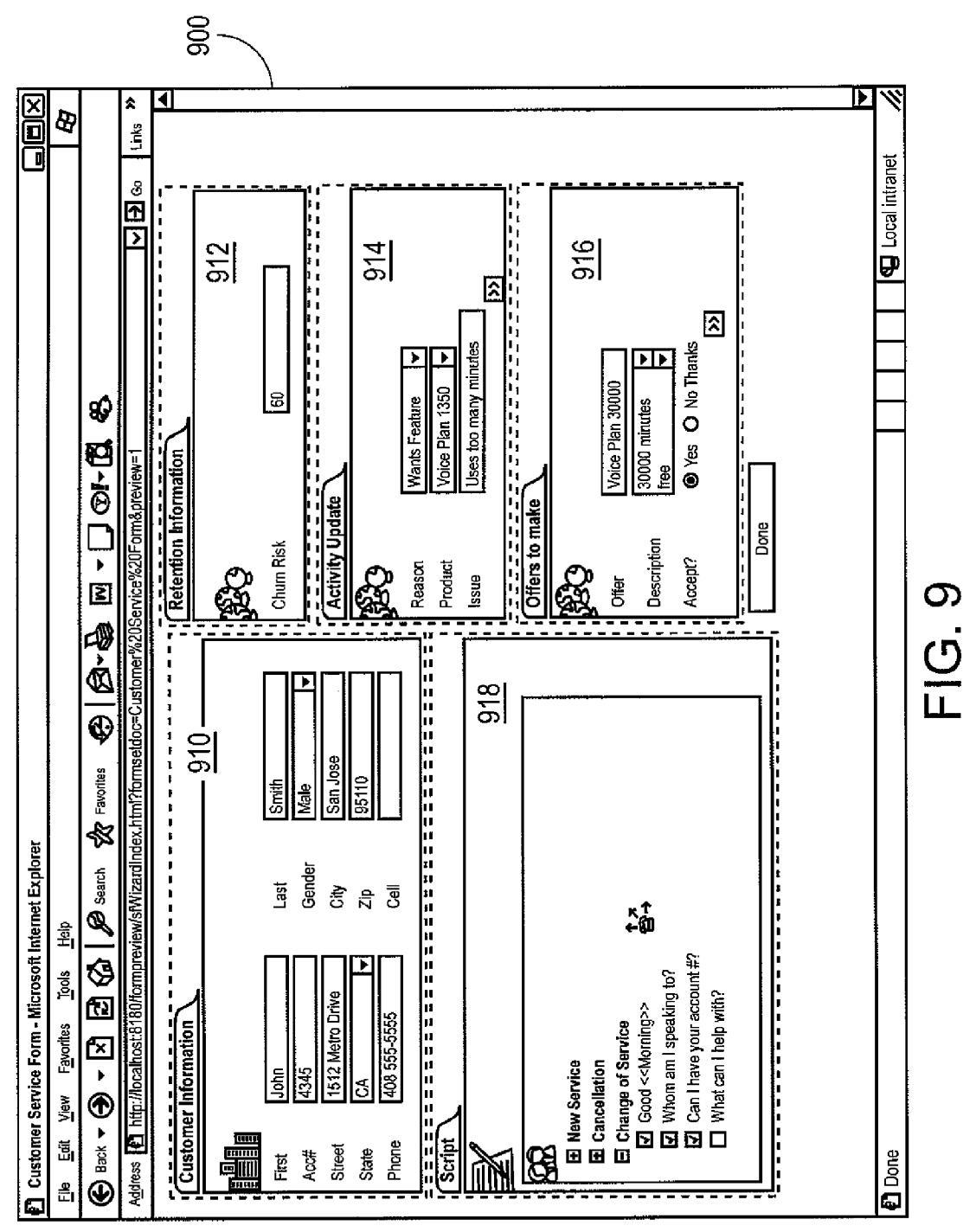

FIG. 9 is an example of a user interface screen for displaying customer information and recommendations and for receiving user input. Main screen 900, which corresponds to screen 840 in FIG. 8, includes customer information area 910 which displays information such as customer name, account number, address, gender, etc. In a call center setting, the customer's information can be retrieved automatically via the caller's telephone identification. Screen 900 includes retention information area 912, which corresponds to area 842 in FIG. 8. Area 912 displays the current churn score associated with the customer. Activity update area 914 corresponds to area 846 in FIG. 8, and is used to receive updated information such as the reason for the call, the product the call relates to, and the customer's issue. Offers to make area 916 corresponds to area 844 in FIG. 8, and displays the current recommended offer for the customer, including a description field. Also included in area 916 are buttons for the user to input the customer's immediate reaction to the offer, such as acceptance or rejection. Screen 900 also includes a script area to guide users in an appropriate dialog with the customer.

Figure 10:
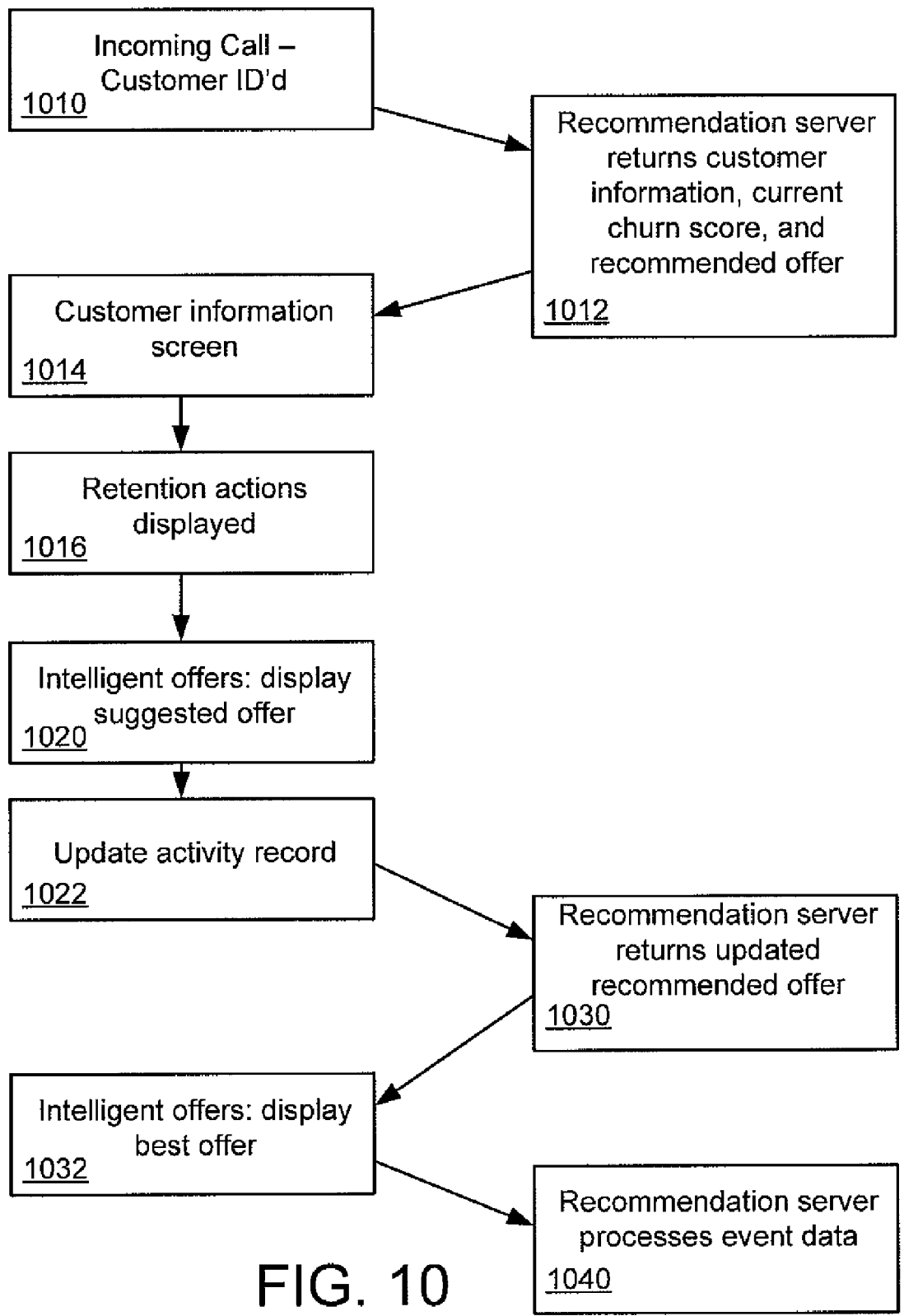
FIG. 10 is a flow chart showing steps for interacting with a user in an example of a call center.

FIG. 10 is a flow chart showing steps for interacting with a user in an example of a call center. In step 1010, a customer call is received. The customer's identification can be gathered directly using caller identification or form the call center system or user. Based on the customer's identification, the recommendation server retrieves the customer's information in step 1012. Based on the customer information, the server determines the best recommended offer for the customer. The recommended offer, along with the current customer churn score, and other customer information are transmitted to the user interface and in step 1014 the customer information is displayed, in step 1016 churn score is displayed, and in step 1020 the recommended offer is displayed. In step 1022, the user inputs additional information from the customer, such as the reason for the call. For example, the customer may be calling requesting information about a particular product or service plan. In this example, the user would input the product or plan information in the activity record in step 1022. Based on the updated information, the recommendation server in real-time, re-calculates the best recommended offer in step 1030. The updated recommendation is passed back to the user interface and is displayed to the user in step 1032. The user then makes the offer to the customer, and enters the customer's response which is passed back to the recommendation server which processes the customer's response and stores the information so that it can be immediately used by the recommendation server through learning in step 1040.

Figure 11:
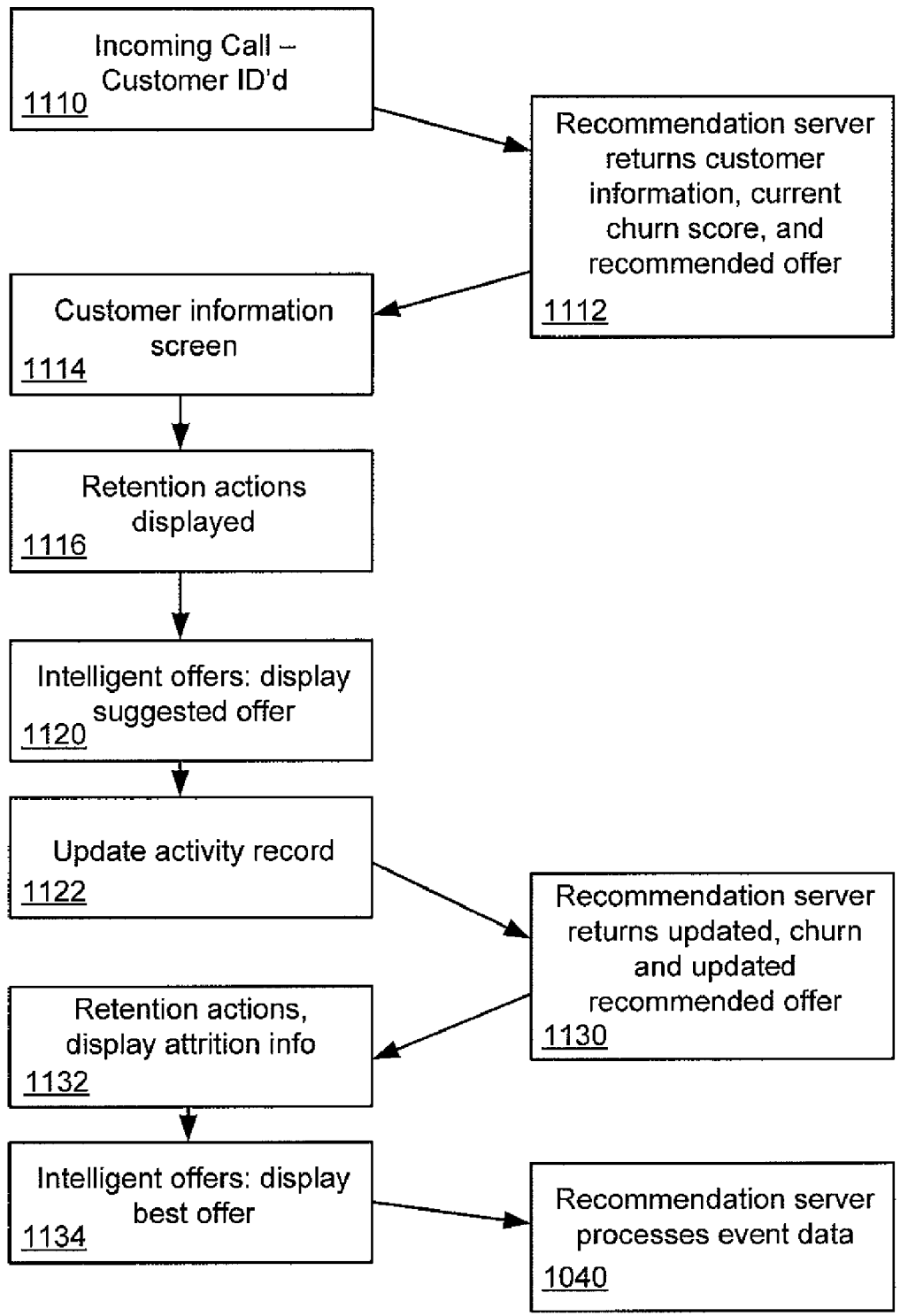
FIG. 11 is a flow chart showing steps for interacting with a user in another example of a call center.

FIG. 11 is a flow chart showing steps for interacting with a user in another example of a call center. In step 1110, a customer call is received and the customer is identified. Based on the customer's identification, the recommendation server retrieves the customer's information in step 1112. As in step 1012 in FIG. 10, based on the customer information, the server determines the best recommended offer for the customer. The recommended offer, along with the current customer churn score, and other customer information are transmitted to the user interface and in step 1114 the customer information is displayed, in step 1116 churn score is displayed, and in step 1120 the recommended offer is displayed. In step 1122, the user inputs additional information from the customer, such as the reason for the call. In the example of FIG. 11, the customer may be calling because the customer is dissatisfied about a current product or service. The user inputs this information in the activity record in step 1122. Based on the updated information, the recommendation server in real-time, re-calculates the best recommended offer in step 1130. In this example, the recommendation server takes into account the customer dissatisfaction and re-calculates the churn score and as a result may take greater account of the customer retention as a goal in determining the best recommended offer. The updated recommendation and churn or attrition information is passed back to the user interface and is displayed to the user in steps 1132 and 1134. The user then makes the offer to the customer, and enters the customer's response which is passed back to the recommendation server which processes the customer's response and stores the information so that it can be immediately used by the recommendation server through learning in step 1140.

Figure 12:
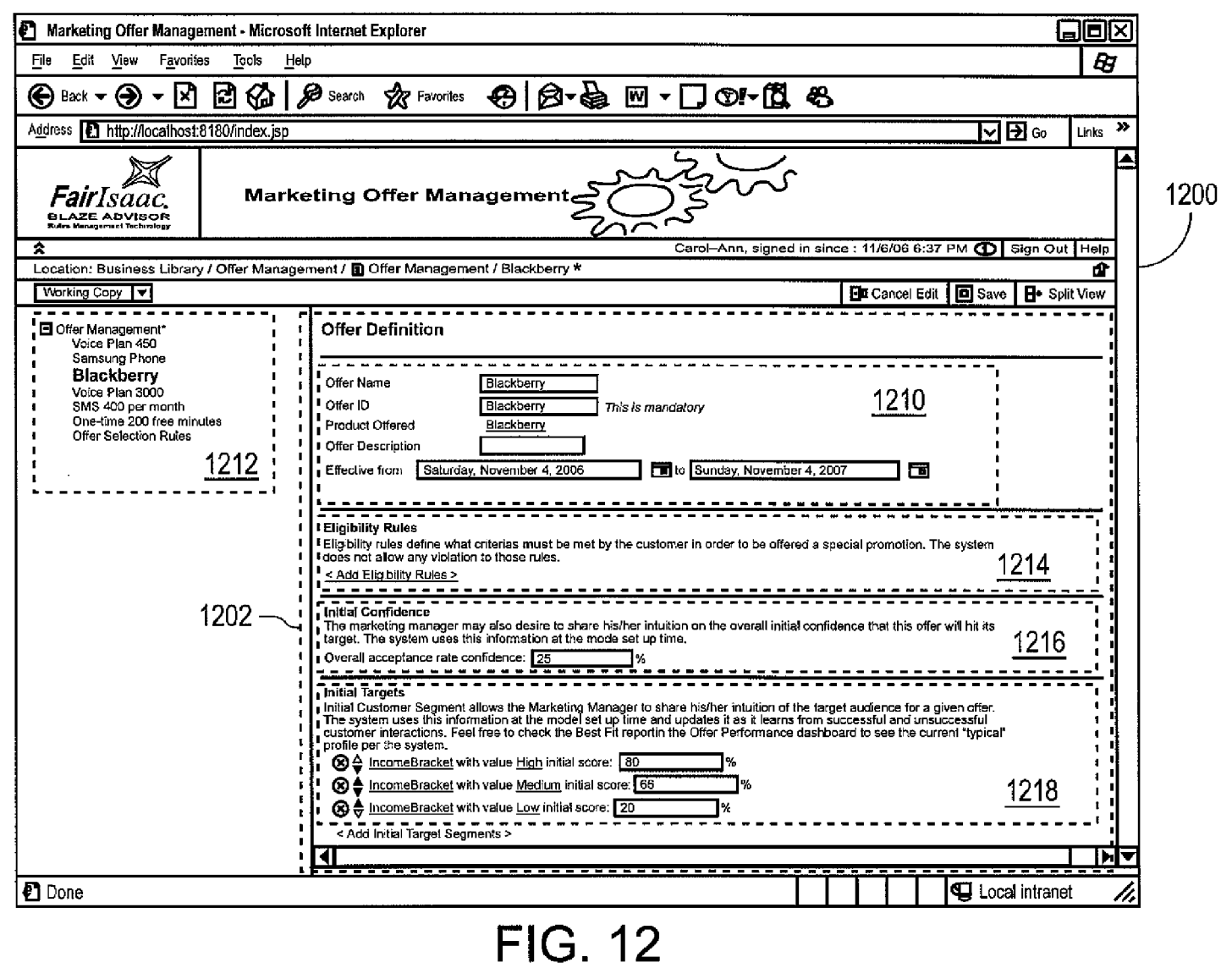

FIG. 12 is an example of a user interface screen for maintaining and updating a rule based adaptive decisioning system. The interface described in FIG. 12 corresponds to part of the browser-based interface 114 shown and described with respect to FIG. 1. Main screen 1200 is used to introduce new items, modify existing items and created or update business rules pertaining to items. In the example shown in FIG. 12, the items are offers for mobile phones and wireless services. Screen 1200 includes an offer definition area 1202 which contains three sub areas for defining items and related business rules and information. Offer identification area 1210 includes areas to enter and display names of the product or service offing, as well as other metadata such as a description and effective dates of the item. Initial confidence area 1216 is used for the user to enter an initial bias for a new item or to update bias for an existing item. Initial targets section 1218, is used to gather the user's input on the target audience for the given item. The system uses this information at the model set up time and updates it as it learns from successful and unsuccessful customer interactions. For example, the user can enter target values for customers having different income brackets. Also included in screen 1200 is a navigation area 1212 which gives users quick access to other items being managed.

Figure 13:
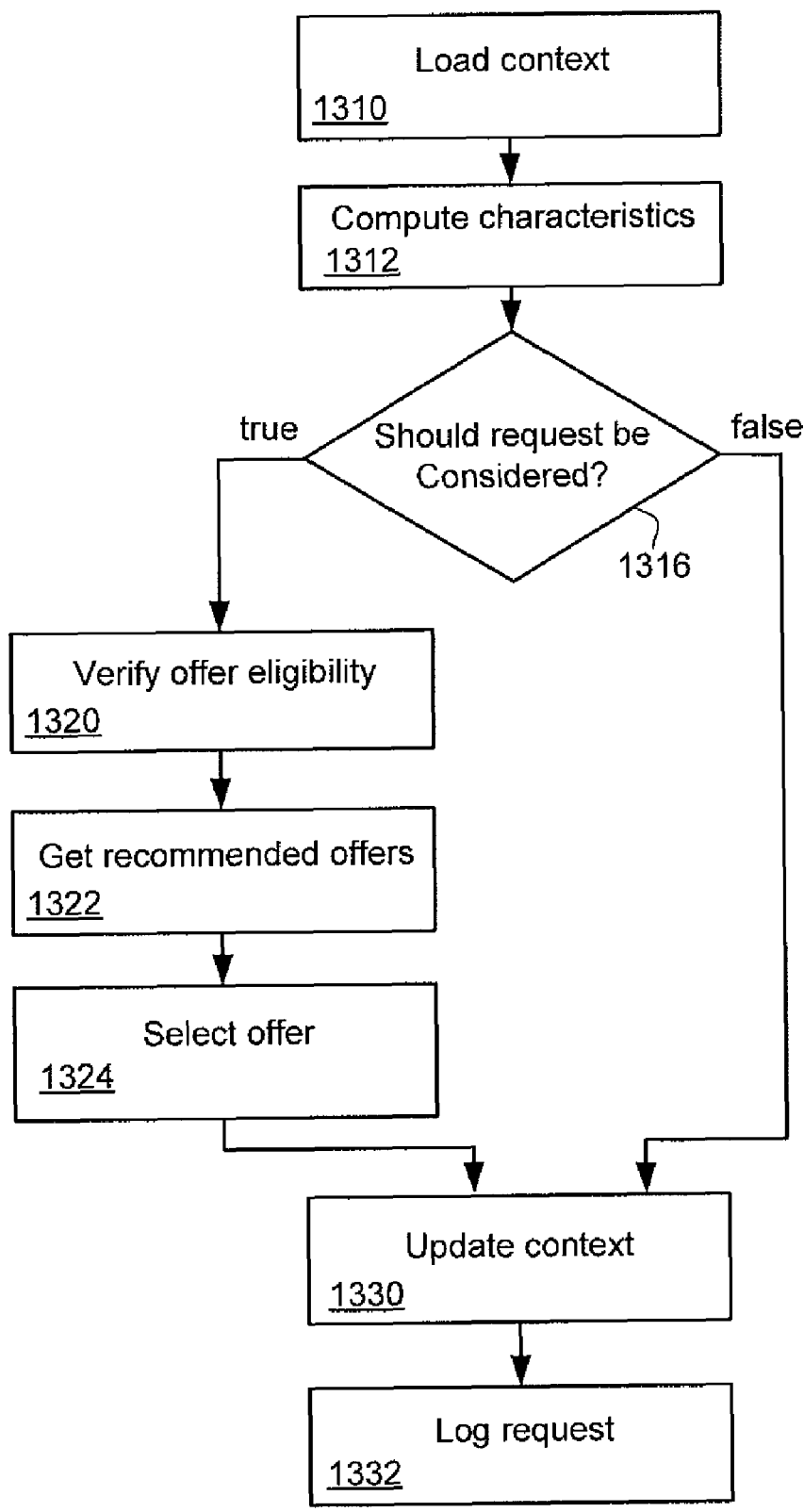
FIG. 13 is a flowchart showing steps in recommendation request processing.

FIG. 13 is a flowchart showing steps in recommendation request processing. In step 1310 the context is loaded. In step 1312, the characteristics are calculated from available information. In step 1316, the request is filtered by verifying whether the request should be processed through the adaptive models or agents. For example, the can be business exceptions global to all recommendations for certain characteristics. In step 1320, for each item or offer available, a verification is made whether the given characteristics, the offer is eligible. For example, there can be business exceptions specific for each offer and for these characteristics. In step 1322 the set of recommendations are provided by the adaptive agents for each pursued goal. In step 1324, one offer that represents the best business compromise for the characteristics and the business objectives is selected. In step 1330 the context is updated and in step 1332 the request is logged.

Figure 14:
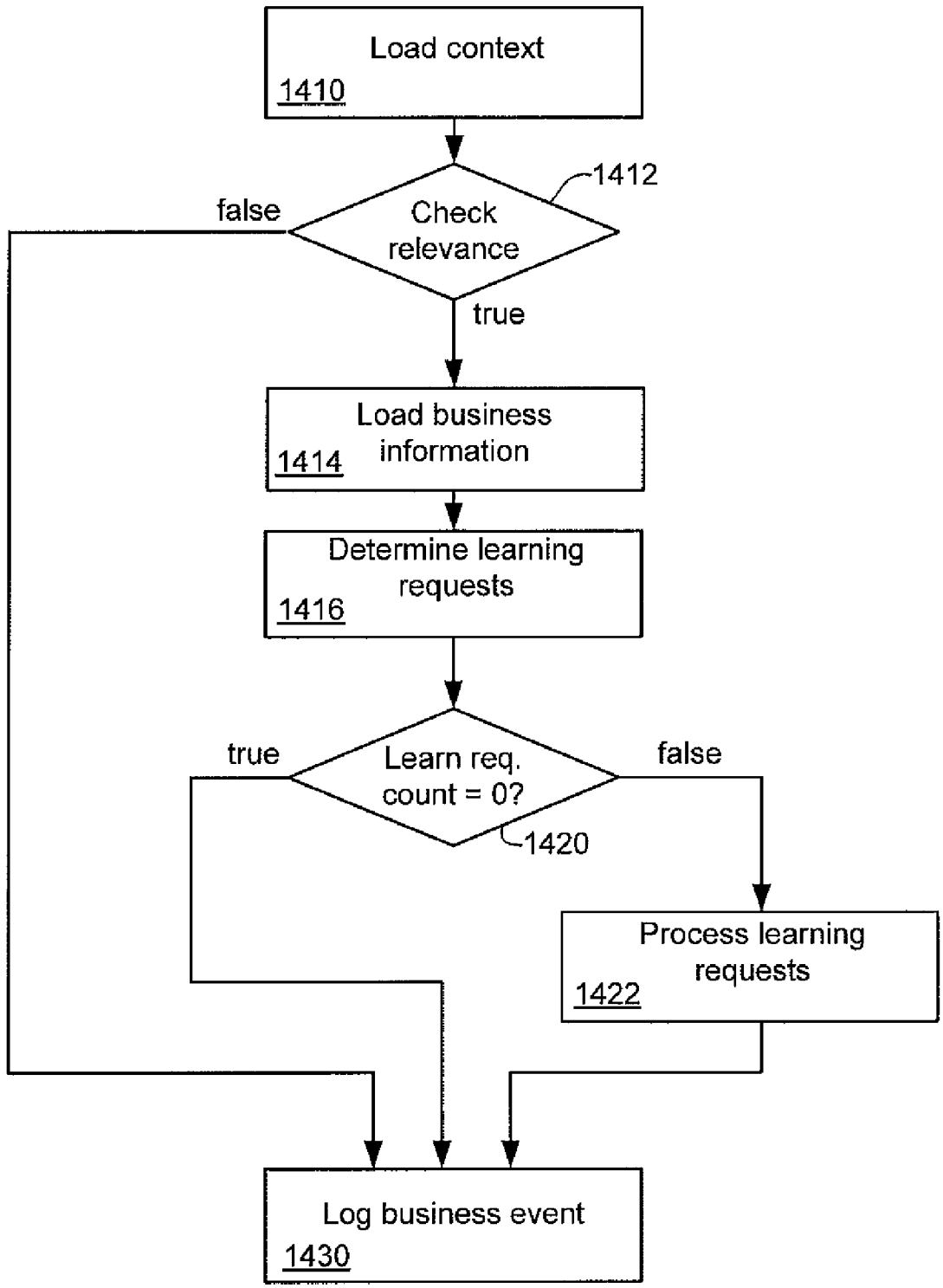
FIG. 14 is a flowchart showing steps involved in information event processing.

FIG. 14 is a flowchart showing steps involved in information event processing. In step 1410 the context is loaded. In step 1412, a check is made to determine whether this event is relevant to the overall learning process. In step 1414, the relevant business information is loaded. In step 1416, a determination of the correlation of the information event to the recommendations made in the past is made. Note that the correlation can be simple, such as with the acceptance to an explicit offer, or can be complicated, as in the purchase of an upgrade to a product purchased following an offer made for it. The result of step 1416 is a number of learning requests depending upon the complexity of the correlation. In step 1422, the learning requests are processed. For each learning event, the learning event is provided back to the runtime manager for processing. In step 1430, the business event is logged.

Other examples of adaptive analytics technology as described herein applied to various applications include the following:

In the public sector: government predictions; complex fraud detection in public security processes; and disease predictions and hospital resources & capacity planning.

In manufacturing: real-time risk management of manufacturing processes; detection of anomalies and exceptions; and real-time technical performance indicators (aircraft, cars, etc.) to improve service processes.

In defense and security: logistics planner; platform for horizontal integration (command & control information systems); homeland security analysis; and fraud detection.

In Banking: credit/risk scoring; loan allocation and rate optimization; monitoring suspicious transactions; and customer recruiting and retention.

In Telecom: customer retention; and network traffic capacity planning.

In Retail & CPG: strategic merchandizing; sales force negotiation support (cross industries); cross selling and up selling; RFID real-time analysis; and performance of collaborative planning, forecasting and replenishment supply chain.

In Services Providers: RT Traffic Performance Management (air traffic, ground traffic); RTA on integrated traffic data from mobile and navigational services; and Recruiting and Resource management.

In Utilities: process manufacturing optimization; demand, supply and price forecasting; risk management; real-time trading and bidding; market simulation tools; and portfolio optimization (aircraft, railcars, . . . ) to improve service processes.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A system for making a recommendation with respect to a plurality of items using a plurality of adaptive agents comprising:
    a plurality of adaptive agents each programmed to generate one or more recommendations with respect to one or more of the items based at least in part on an evaluation of prior outcomes relating to the items;
    a management system arranged and programmed to receive one or more business rules, and manage the plurality of adaptive agents according to the business rules such that at least one final recommendation is selected from among the one or more recommendations from the plurality of adaptive agents; and
    a user interface adapted to display at least one final recommendation to a user;
    wherein at least some of adaptive agents have variable learning rates, the learning rate influencing a degree on which prior outcomes are relied upon when selecting a choice.

2. A system according to claim 1, wherein each of the plurality of adaptive agents considers a set of the items in generating the one or more recommendations, and wherein the management system defines the set of the items by selecting items from the plurality of items based at least in part on the received business rules.

3. A system according to claim 2, wherein the business rules include item eligibility rules which are used to select the set of items, the eligibility rules including one or more types selected from the group comprising: geographical restrictions, customer-income restrictions, customer purchases, history restrictions, demographic restrictions, time of the day restrictions, and business condition-related restrictions.

4. A system according to claim 1, wherein the management system selects one or more of the plurality of adaptive agents according to the business rules such that the at least one final recommendation originates from one of the selected adaptive agents.

5. A system according to claim 4, wherein the management system receives a request for a recommendation and based on the business rules routes the request to a single adaptive agent.

6. A system according to claim 1, wherein the business rules include one or more business goals, and the management system selects one final recommendation based on the one or more business goals.

7. A system according to claim 6, wherein the one or more business goals is selected from the group comprising: revenue maximization, profit maximization, customer satisfaction, customer retention, loss minimization, market penetration, and increase in market share.

8. A system according to claim 1, wherein the management system initiates new adaptive agents and retires existing adaptive agents based on the received business rules.

9. A system according to claim 8, wherein the business rules include rules having one or more parameters selected from the group comprising: how often agents are created, how many agents should be instantiated concurrently, and how long an agent can remain active before retirement.

10. A system according to claim 1, wherein the management system receives and stores information on outcomes relating to items.

11. A system according to claim 10, wherein the user interface receives the information on outcomes relating to items and sends the information to the management system.

12. A system according to claim 10, wherein the management system determines whether the information has a correlation with one or more prior recommendations.

13. A system according to claim 1, further comprising a maintenance interface arranged and programmed to receive from maintenance users the business rules.

14. A system according to claim 13, wherein the maintenance interface is further arranged and programmed to receive new items for inclusion in the plurality of items.

15. A system according to claim 14, wherein the maintenance interface is further arranged and programmed to receive initial biases with respect to the new items.

16. A system according to claim 1, wherein the adaptive agents are adaptive decisioning agents.

17. A system according to claim 1, wherein the items include items having one or more types selected from the group comprising: products, services, offers for products, offers for services, suppliers, and agencies.

18. A system according to claim 1, wherein the user interface is adapted to receive a request for a recommendation with respect to the plurality of items.

19. A system according to claim 18, wherein the request is received from the user.

20. A system according to claim 18, wherein the request is generated automatically by the user interface.

21. A computer-implemented method for making a recommendation with respect to a plurality of items using a plurality of adaptive agents comprising:
    receiving one or more business rules;
    receiving a request for a recommendation;
    receiving attributes relating to the request;
    activating one or more adaptive agents such that each activated adaptive agent generates one or more recommendations with respect to the one or more items based at least in part on an evaluation of prior outcomes relating to the items;
    selecting from among the one or more recommendations at least one final recommendation; and
    displaying the at least one final recommendation to a user;
    wherein at least some of adaptive agents have variable learning rates, the learning rate influencing a degree on which prior outcomes are relied upon when selecting a choice.

22. A method according to claim 21 further comprising:
defining a set of the items by selecting items from the plurality of items based at least in part on the received business rules, wherein each of the plurality of adaptive agents considers the set of the items in generating the one or more recommendations.

23. A method according to claim 22, wherein the business rules include item eligibility rules which are used to select the set of items, the eligibility rules including one or more types selected from the group comprising: geographical restrictions, customer-income restrictions, customer purchases, history restrictions, demographic restrictions, time of the day restrictions, and business condition-related restrictions.

24. A method according to claim 21, wherein the activating of one or more of the plurality of adaptive agents is carried out according to the business rules such that the at least one final recommendation originates from one of the selected adaptive agents.

25. A method according to claim 24 further comprising:
receiving a request for a recommendation; and
routing the request to a single activated adaptive agents based on the business rules.

26. A method according to claim 25, wherein the request is received from a user via a user interface.

27. A method according to claim 24, wherein the request is generated automatically.

28. A method according to claim 21, wherein the business rules include one or more business goals, and one final recommendation is selected based on the one or more business goals.

29. A method according to claim 28, wherein the one or more business goals is selected from the group comprising: revenue maximization, profit maximization, customer satisfaction, customer retention, loss minimization, market penetration, and increase in market share.

30. A method according to claim 21 further comprising:
initiating new adaptive agents and retiring existing adaptive agents based on the received business rules.

31. A method according to claim 30, wherein the business rules include rules having one or more parameters selected from the group comprising: how often agents are created, how many agents should be instantiated concurrently, and how long an agent can remain active before retirement.

32. A method according to claim 21 further comprising:
receiving and storing information on outcomes relating to items.

33. A method according to claim 32, wherein the information on outcomes relating to items is received from a user via a user interface.

34. A method according to claim 32 further comprising:
determining whether the information has a correlation with one or more prior recommendations.

35. A method according to claim 21, wherein the business rules are received from one or more maintenance users via a maintenance interface.

36. A method according to claim 35 further comprising:
receiving new items for inclusion in the plurality of items from one or more maintenance users via the maintenance interface.

37. A method according to claim 36 further comprising:
receiving an initial bias with respect to a new item.

38. A method according to claim 21, wherein the items include items having one or types selected from the group comprising: products, services, offers for products, offers for services, suppliers, and agencies.

39. An article comprising a tangible machine-readable storage medium embodying instructions that when performed by one or more machines result in operations for making a recommendation with respect to a plurality of items using a plurality of adaptive agents comprising:
receiving one or more business rules;
receiving a request for a recommendation;
receiving attributes relating to the request;
activating one or more adaptive agents such that each activated adaptive agent generates one or more recommendations with respect to the one or more items based at least in part on an evaluation of prior outcomes relating to the items;
selecting from among the one or more recommendations at least one final recommendation; and
displaying the at least one final recommendation to a user;
wherein at least some of adaptive agents have variable learning rates, the learning rate influencing a degree on which prior outcomes are relied upon when selecting a choice.

40. An article according to claim 39, wherein the tangible machine-readable storage medium further embodies instructions that when performed by one or more machines result in operations comprising:
defining a set of the items by selecting items from the plurality of items based at least in part on the received business rules, wherein each of the plurality of adaptive agents considers the set of the items in generating the one or more recommendations.

41. An article according to claim 40, wherein the business rules include item eligibility rules which are used to select the set of items, the eligibility rules including one or more types selected from the group comprising: geographical restrictions, customer-income restrictions, customer purchases, history restrictions, demographic restrictions, time of the day restrictions, and business condition-related restrictions.

42. An article according to claim 39, wherein the activating of one or more of the plurality of adaptive agents is carried out according to the business rules such that the at least one final recommendation originates from one of the selected adaptive agents.

43. An article according to claim 42, wherein the tangible machine-readable storage medium further embodies instructions that when performed by one or more machines result in operations comprising:
receiving a request for a recommendation; and
routing the request to a single activated adaptive agents based on the business rules.

44. An article according to claim 42, wherein the request is received from a user via a user interface.

45. An article according to claim 42, wherein the request is generated automatically.

46. An article according to claim 39, wherein the business rules include one or more business goals, and one final recommendation is selected based on the one or more business goals.

47. An article according to claim 46, wherein the one or more business goals is selected from the group comprising: revenue maximization, profit maximization, customer satisfaction, customer retention, loss minimization, market penetration, and increase in market share.

48. An article according to claim 39, wherein the tangible machine-readable storage medium further embodies instructions that when performed by one or more machines result in operations comprising:
initiating new adaptive agents and retiring existing adaptive agents based on the received business rules.

49. An article according to claim 48 wherein the business rules include rules having one or more parameters selected from the group comprising: how often agents are created, how many agents should be instantiated concurrently, and how long an agent can remain active before retirement.

50. An article according to claim 39, wherein the tangible machine-readable storage medium further embodies instructions that when performed by one or more machines result in operations comprising:
    receiving and storing information on outcomes relating to items.

51. An article according to claim 50, wherein the information on outcomes relating to items is received from a user via a user interface.

52. An article according to claim 50, wherein the tangible machine-readable storage medium further embodies instructions that when performed by one or more machines result in operations comprising:
    determining whether the information has a correlation with one or more prior recommendations.

53. An article according to claim 39, wherein the business rules are received from one or more maintenance users via a maintenance interface.

54. An article according to claim 53, wherein the tangible machine-readable storage medium further embodies instructions that when performed by one or more machines result in operations comprising:
    receiving new items for inclusion in the plurality of items from one or more maintenance users via the maintenance interface.

55. An article according to claim 54, wherein the tangible machine-readable storage medium further embodies instructions that when performed by one or more machines result in operations comprising:
    receiving an initial bias with respect to a new item.

56. An article according to claim 39, wherein the items include items having one or types selected from the group comprising: products, services, offers for products, offers for services, suppliers, and agencies.

* * * * *